(12) United States Patent
Paola et al.

(10) Patent No.: US 11,003,508 B2
(45) Date of Patent: May 11, 2021

(54) APPARATUS AND METHODS FOR LOAD BALANCING ACROSS A NETWORK OF NODES

(71) Applicants: ARM IP LIMITED, Cambridge (GB); ARM LIMITED, Cambridge (GB)

(72) Inventors: Christopher Mark Paola, Cambridge (GB); Milosch Meriac, Cambridge (GB); Remy Pottier, Cambridge (GB)

(73) Assignees: ARM Limited, Cambridge (GB); ARM IP Limited, Cambridge (GB)

( * ) Notice: Subject to any disclaimer, the term of this patent is extended or adjusted under 35 U.S.C. 154(b) by 173 days.

(21) Appl. No.: 15/572,692

(22) PCT Filed: Apr. 21, 2016

(86) PCT No.: PCT/GB2016/051108
§ 371 (c)(1),
(2) Date: Nov. 8, 2017

(87) PCT Pub. No.: WO2016/181104
PCT Pub. Date: Nov. 17, 2016

(65) Prior Publication Data
US 2018/0136984 A1  May 17, 2018

(30) Foreign Application Priority Data
May 13, 2015 (GB) .................................. 1508157

(51) Int. Cl.
*G06F 15/173* (2006.01)
*G06F 9/50* (2006.01)
(Continued)

(52) U.S. Cl.
CPC ........ *G06F 9/5088* (2013.01); *G06F 11/3409* (2013.01); *G06F 11/3442* (2013.01);
(Continued)

(58) Field of Classification Search
CPC ............... G06F 9/5088; G06F 11/3442; G06F 11/3409; G06F 11/34; H04L 67/327; H04L 67/1008; H04L 67/10
See application file for complete search history.

(56) References Cited

U.S. PATENT DOCUMENTS

| 6,609,216 B1 | 8/2003 | Almy et al. |
| 2008/0068649 A1 | 3/2008 | Emori |

(Continued)

FOREIGN PATENT DOCUMENTS

| CN | 104335175 A | 2/2015 |

OTHER PUBLICATIONS

Examination Report dated Sep. 18, 2018 in GB Application No. 1508157.3, 6 pages.
(Continued)

*Primary Examiner* — Suraj M Joshi
*Assistant Examiner* — Jaren Means
(74) *Attorney, Agent, or Firm* — Nixon & Vanderhye, P.C.

(57) ABSTRACT

A system provided at nodes within a network of nodes enabling the nodes to migrate activities to other nodes within its communication range to provide load balancing across the network. The other nodes having power and processing capabilities and capacity enabling them to undertake the migrated activities.

22 Claims, 5 Drawing Sheets

Figure 1:
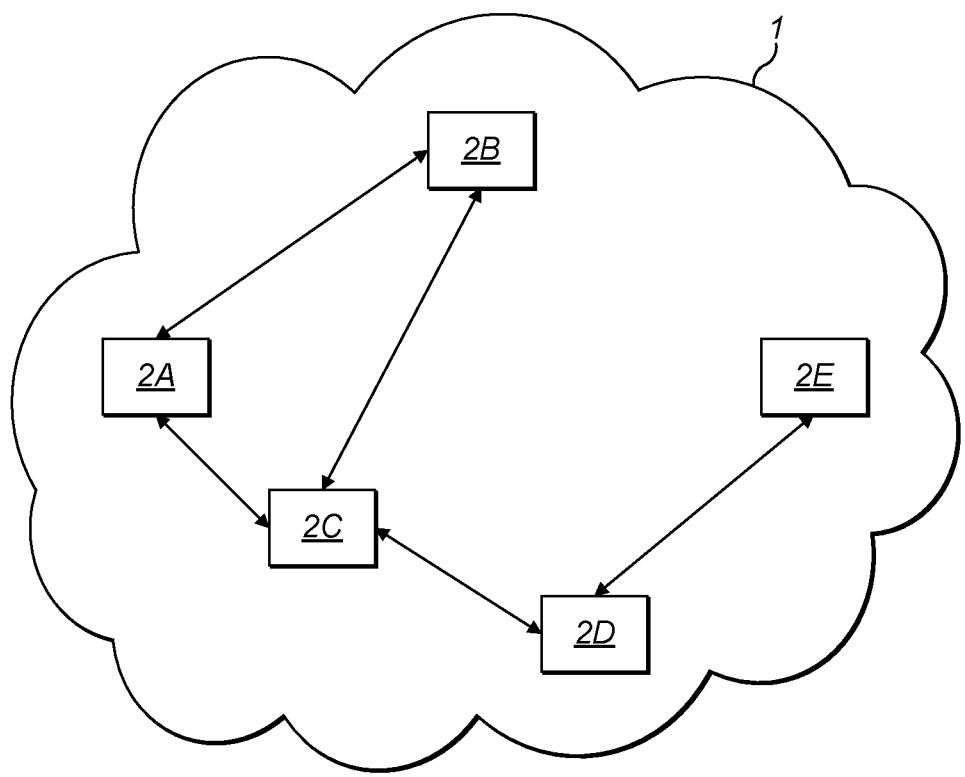

(51) Int. Cl.
　　　*H04L 29/08*　　　(2006.01)
　　　*G06F 11/34*　　　(2006.01)

(52) U.S. Cl.
　　　CPC .......... *H04L 67/10* (2013.01); *H04L 67/1008* (2013.01); *H04L 67/327* (2013.01); *G06F 11/34* (2013.01)

(56) References Cited

U.S. PATENT DOCUMENTS

| | | |
|---|---|---|
| 2011/0041136 A1 | 2/2011 | Messier et al. |
| 2011/0047555 A1* | 2/2011 | Lakshmanan ......... G06F 9/5088 718/105 |
| 2012/0198251 A1 | 8/2012 | Boldryev et al. |
| 2012/0324069 A1* | 12/2012 | Nori ...................... G06F 9/5066 709/222 |
| 2013/0080641 A1* | 3/2013 | Lui ....................... H04L 43/046 709/226 |
| 2013/0219407 A1 | 8/2013 | Weinman, Jr. |
| 2014/0226485 A1* | 8/2014 | Heinz .................... H04L 43/16 370/235 |
| 2015/0033239 A1 | 1/2015 | Heilper et al. |

OTHER PUBLICATIONS

International Search Report and Written Opinion of the ISA for PCT/GB2016/051108, dated Sep. 15, 2016, 18 pages.
GB Search and Examination Report for GB1508157.3, dated Nov. 6, 2015, 11 pages.
Examination Report for GB Application No. 1508157.3 dated Apr. 29, 2019, 4 pages.
Office Action in corresponding Chinese Application 201680027559.0 dated Mar. 23, 2020 with English translation (8 pages).

* cited by examiner

APPARATUS AND METHODS FOR LOAD BALANCING ACROSS A NETWORK OF NODES

This application is the U.S. national phase of International Application No. PCT/GB2016/051108 filed 21 Apr. 2016, which designated the U.S. and claims priority to GB Patent Application No. 1508157.3 filed 13 May 2015, the entire contents of each of which are hereby incorporated by reference.

The present subject matter relates generally to apparatus and methods for load balancing across a network of nodes. More specifically, the apparatus and methods disclosed relate to migrating activities to nodes in a network to balance loads across the network.

In recent years, programs have been provided which can be run from a cloud server or from an Internet of Things (IoT) device. However, in order for the same program to be run at the cloud and the device, two different codes are required, one for the cloud and one for the server.

A disadvantage of running programs from a cloud server, in communication with an IoT device, is that the connection to the cloud can be lost resulting in the program not completing at the device.

According to a first aspect a system for selecting a node within a network of nodes for performing an activity is provided. The system comprising: a device capabilities monitor configured to determine capabilities of a node provided with the system; a metrics module configured to determine node metrics; a migration determination module configured to determine processing requirements of the activity, and to determine that performance of the activity is to be migrated to another node in the network as a result of the determined processing requirements of the activity, the determined capabilities of the node and the determined node metrics; a remote devices monitor configured to identify other nodes in the network of nodes and to select one of the identified nodes to perform the activity; and a request generation module configured to transfer the activity to the selected node.

According to a further aspect a computer application program for carrying out a method of selecting a node within a network of nodes for performing an activity is provided. The program comprising: determining capabilities of each node within the network of nodes; determining metrics of performing the activity at each node within the network of nodes; determining processing requirements of the activity; determining that performance of the activity is to be completed by one of the nodes within a network of nodes selected as a result of the determined processing requirements of the activity, the determined capabilities of each node and the determined metrics of performing the activity at each node; requesting performance of the activity by the selected node, the request containing the activity.

According to a further aspect a method for determining when to migrate an activity from a node to another node within a network is provided. The method comprising: determining the capabilities of the node; determining the metrics of performing the activity; determining that the metrics of performing the activity at another node is cheaper than performing the activity at the node; and migrating the activity to the another node.

According to a further aspect a method of migrating an activity to a node in a network is provided. The method comprising: identifying nodes within communication range of the node; requesting capabilities of each of the identified nodes; requesting metrics of each of the identified nodes; requesting a code manifest of each of the identified nodes; using the requested capabilities, metrics and code manifests to select one of the identified nodes to migrate the activity; transferring the data and code, if not already provided at the node, required to perform the activity to the selected node.

According to a further aspect a computer readable medium recorded with computer readable code arranged to cause a computer to perform the method for determining when to migrate an activity from a node to another node within a network is provided.

According to a further aspect a computer readable medium recorded with computer readable code arranged to cause a computer to perform the method of migrating an activity to a node in a network is provided.

Figure 2:
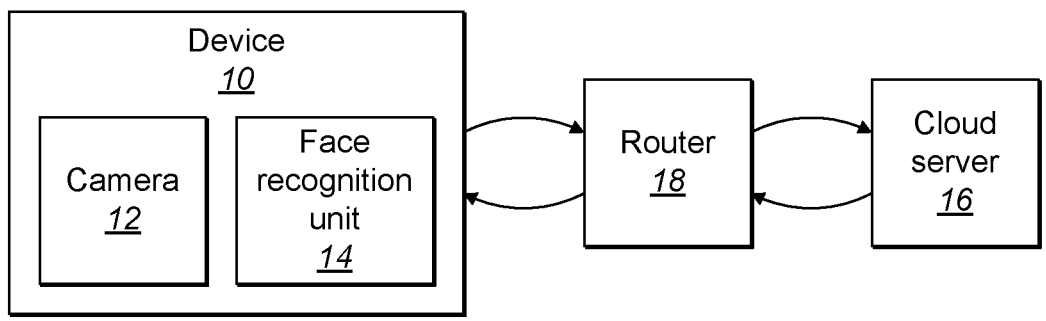
Figure 3:
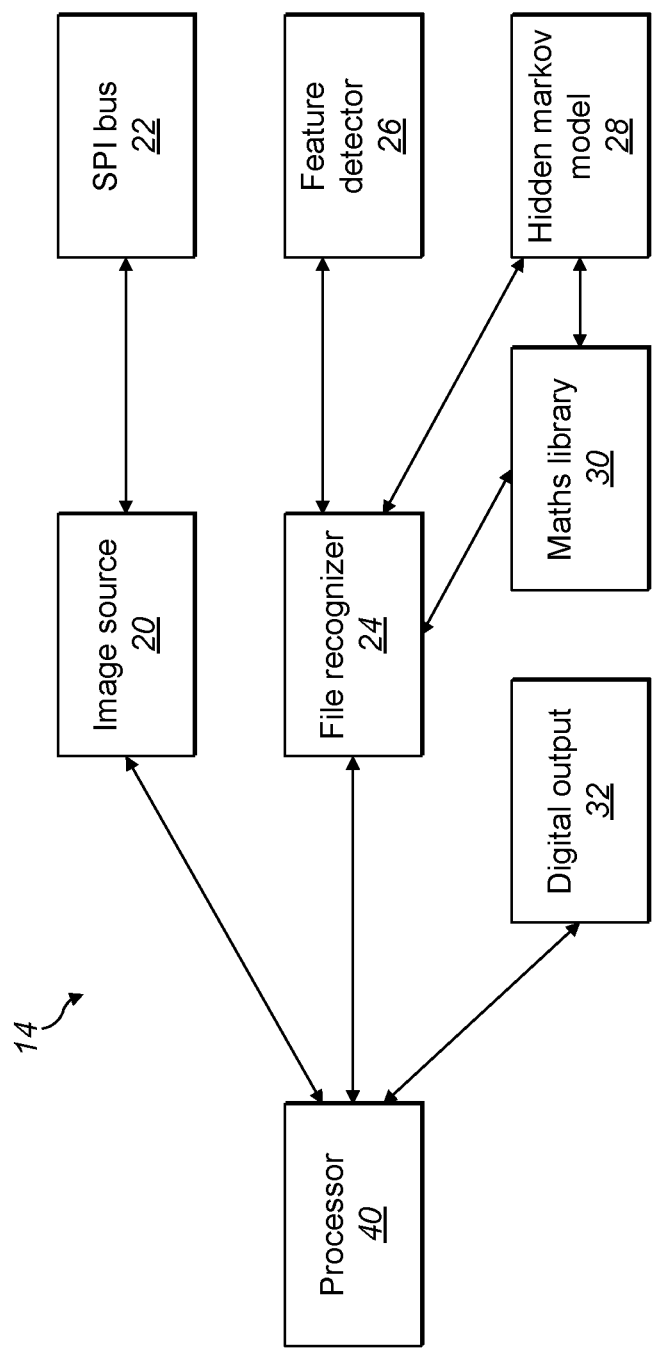
Figure 4:
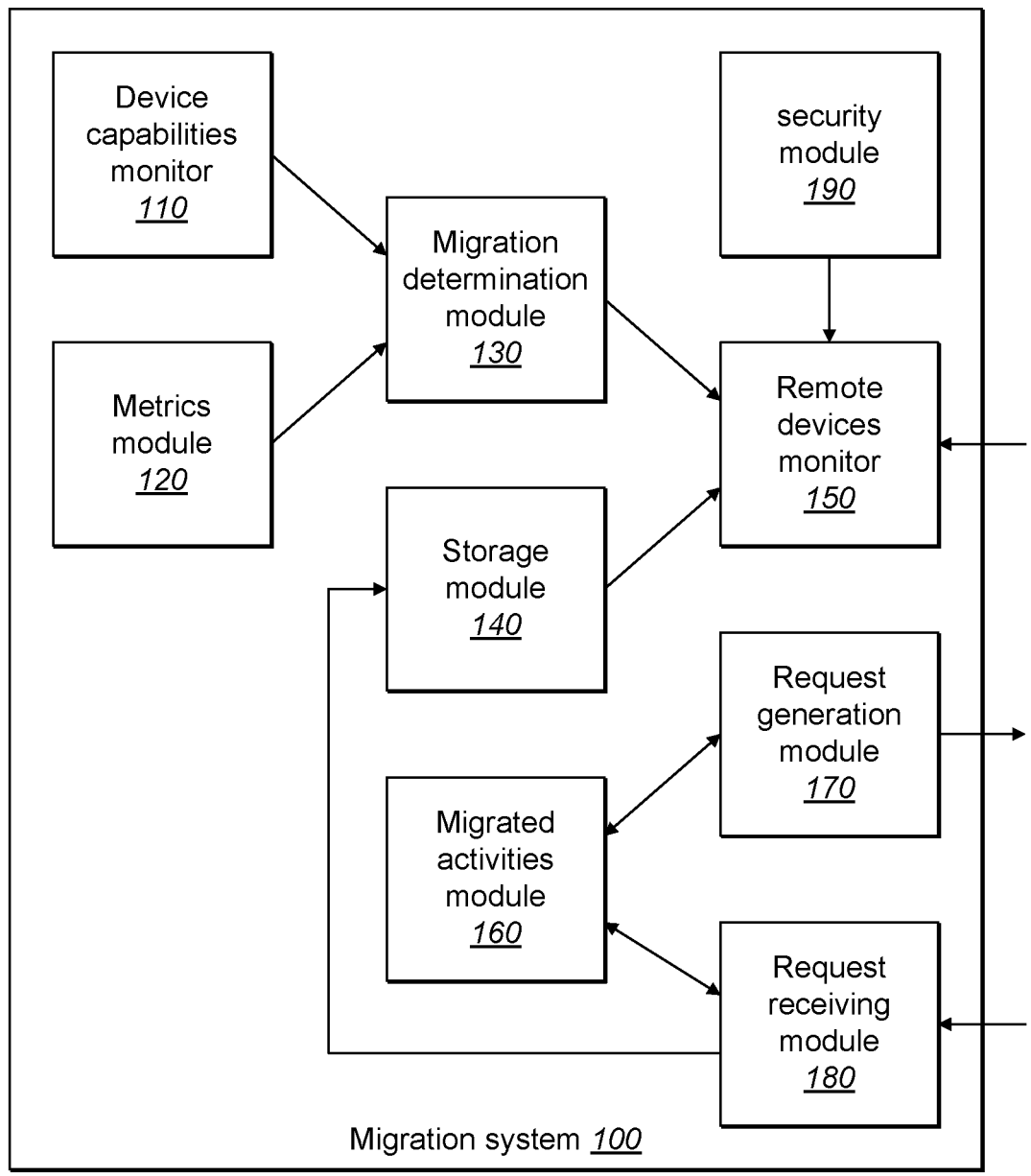
Figure 5:
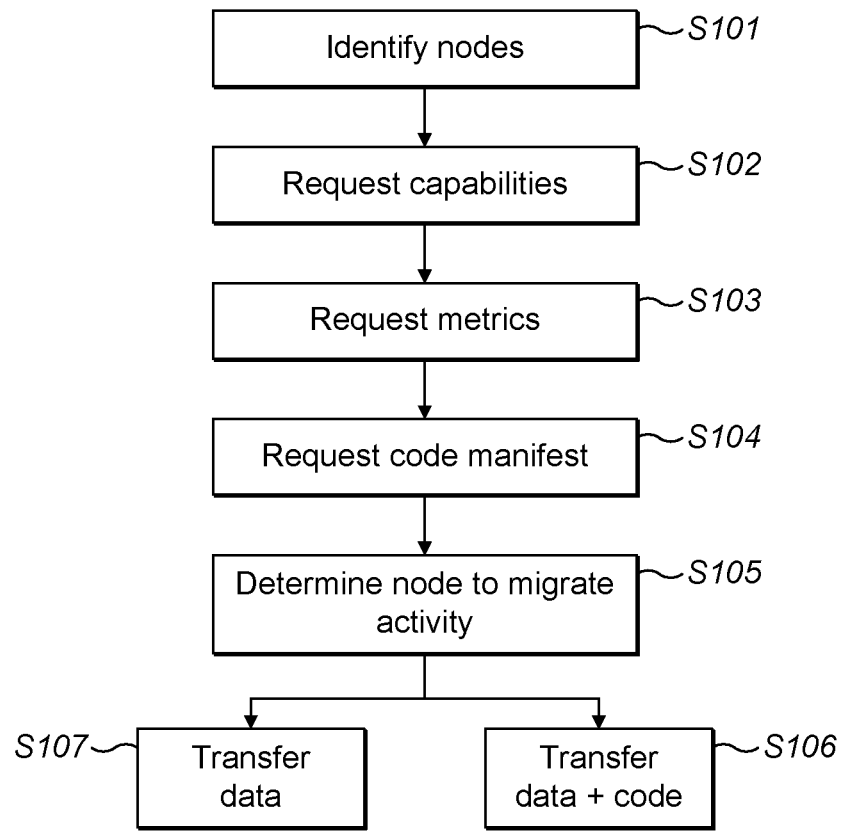
Figure 6:
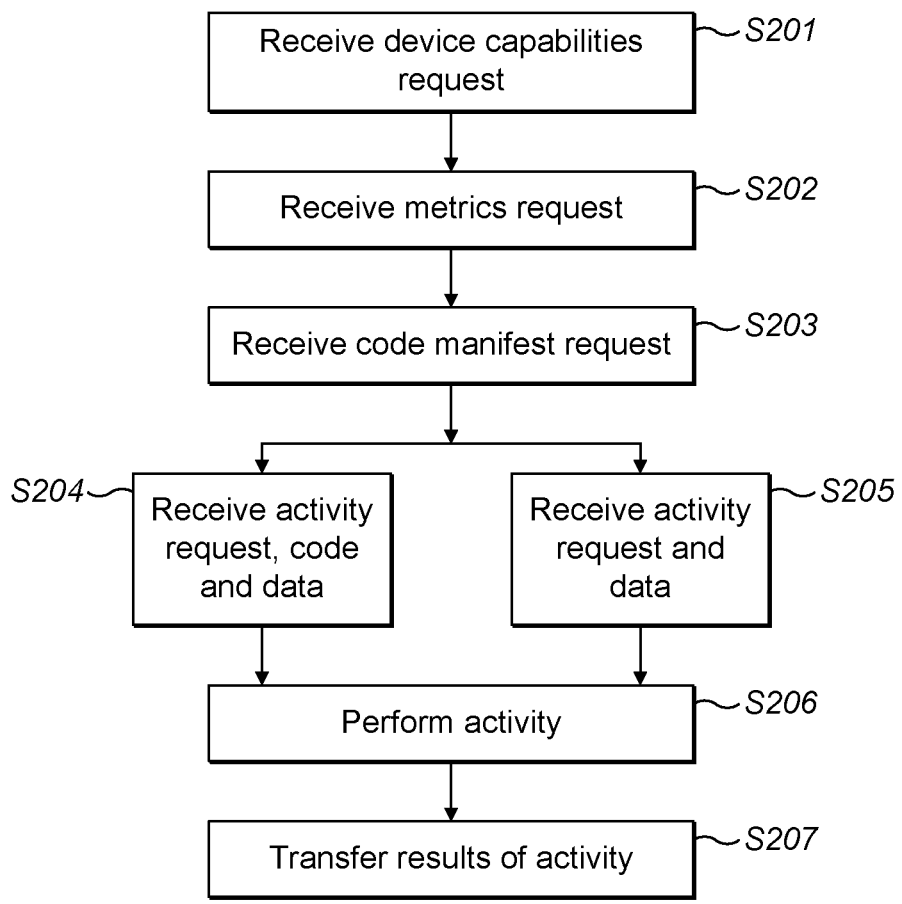

For a better understanding of the embodiments and as to how the same may be carried into effect reference will now be made, by way of example only, to the accompanying figures in which:

FIG. 1 schematically illustrates a network of nodes;
FIG. 2 schematically illustrates an IoT device;
FIG. 3 schematically illustrates a face recognition unit;
FIG. 4 schematically illustrates a migration system;
FIG. 5 is a flow diagram schematically illustrating a process for migrating an activity to a remote device; and
FIG. 6 is a flow diagram schematically illustrating a process for receiving an activity from a remote device.

In the figures, like reference numerals refer to the same or similar elements.

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

FIG. 1 schematically illustrates a network 1 of nodes 2, where each node 2 in the network 1 is an IoT (Internet of Things) device or a cloud server. Each node 2 is within communication range of at least one of the other nodes 2. As known in the art, each node 2 is capable of performing a scan of the surrounding area in order to identify other nodes 2 which are within its communication range. Each node 2 may be capable of communication via several different communication networks, such as 3G, WiFi, Bluetooth etc. and each node 2 may be within communication range of different nodes 2 dependent on the communication network used.

For example, with reference to FIG. 1, node 2A is capable of communication with node 2B using WiFi and is capable of communication with node 2C using Bluetooth. In addition, each node may be capable of communication with another node 2 using more than one different communication network. For example, with reference to FIG. 1, node 2D is capable of communication with node 2E using WiFi and Bluetooth.

The nodes 2 can be highly asymmetric with regards to differing power, battery life, processing speed and storage space. In addition, each node 2 is an independent device capable of performing its own predetermined functions.

FIG. 2 schematically illustrates an IoT device 10, such as mobile telephone, which utilises face recognition technology, in the form of a camera 12 and face recognition unit 14, in order to unlock the mobile telephone 10 when an authorized user is present. The mobile telephone 10 is capable of communication with a cloud server 16 via a router 18. The mobile telephone 10 may also be capable of communication with other devices/servers not illustrated. The mobile telephone 10, the cloud server 16 and the router 18 can all be considered as nodes within a network.

FIG. 3 schematically illustrates the face recognition unit 14. The face recognition unit 14 comprises an image source 20, a SPI (Serial Peripheral Interface) bus 22, a face recognizer 24, a feature detector 26, a hidden markov model 28, a math's library 30, a digital output 32 and a processor 40. When the face recognition unit 14 is run at the device 10, it is very demanding on the processing capabilities and power consumption of the device 10. In one embodiment, to reduce these demands, the device 10 migrates the most demanding activities, for example, the feature detector 26 and math's library 30, to another node within its communication range which has capabilities and capacity enabling it to undertake the activities.

For ease of understanding, the node which is migrating the at least one activity will henceforth be referred to as the migration device and can be a device or a server. In addition, the node which is receiving the migrated activity will henceforth be referred to as the remote device and can be a device or a server. As will be explained in further detail below, the migration device may also be capable of receiving migrated activities, at which point it will be referred to as the remote device, and the remote device may also be capable of migrating activities, at which point it will be referred to as the migration device.

In the example illustrated in FIGS. 2 and 3, the migration device 10 migrates the feature detector 26 and the math's library 30 to the router 18 (the remote device). The router 18 is within communication range of the device 10 and has a mains power source. In addition, the router 18 has processing capabilities which enable it to undertake the migrated activities it has received from the migration device 10. The results of the migrated activities are transferred back to the migration device 10 such that the device 10 can be unlocked when an authorized user is present. Alternatively, or in addition, the migration device 10 could migrate the feature detector 26 and/or the math's library 30 to the cloud server 16 for processing.

In another example, it's possible to achieve greater compression rates by migrating the compression of data from a battery device (the migration device) to a remote device such as a mains powered WiFi router. This is because the WiFi router is likely to have larger compression windows or more sophisticated algorithms (such as wavelet compression etc.).

In another example, a Bluetooth device may be required to regularly poll an SSL based internet service. The Bluetooth device (the migration device) is able to migrate the polling task to a mains powered border router (the remote device) such that the remote device regularly polls the SSL based internet service and only sends notification to the migration device when new data becomes available. The result is a reduction of power consumption at the migration device compared to when the migration device was required to run a fully-fledged SSL handshake once every few minutes with the internet service.

The migration of activities to nodes within a network which have capacity provides load balancing across the network and potentially increases processing speeds across the network. In order to migrate activities which would conventionally be run at the device, the device 10 is provided with a migration system. In addition, each of the nodes to which the migration device migrates activities is also provided with the migration system.

FIG. 4 schematically illustrates the migration system 100. The migration system 100 comprises a device capabilities monitor 110, a metrics module 120, a migration determination module 130, a storage module 140, a remote devices monitor 150, a migrated activities module 160, a request generation module 170, a request receiving module 180, and a security module 190.

The device capabilities monitor 110 is configured to determine one or more of the capabilities of the device, such as the processing capabilities and available storage at the device. The device capabilities monitor 110 constantly monitors the devices operation and keeps performance counters for: data exchange with a cloud (density pattern, amount, bandwidth); power demands for code blocks (compression etc.); power demands for local storage (flash access etc.). The device capabilities monitor 110 also contains information regarding the features of the device, such as whether the device has a display or speakers etc. An activity which requires a display should not be migrated to a node which does not have a display and likewise an activity which requires speakers should not be migrated to a node which does not have speakers etc.

The metrics module 120 determines node metrics which are used to determine what activities can be performed most efficiently at which node. The metrics include a power budget at the device, the processing speed of the device and communication technologies available to the device.

The metrics module 120 is configured to determine a power budget at the device, for example, the battery level of the device or whether the device is connected to mains power. The metrics module 120 is also configured to determine the processing speed of the device. The metrics module 120 is further configured to identify the communication technologies available to the device, i.e. 3G/WiFi network etc. and the associated bandwidth and the latency of the communication link to a potential remote device for each communication technology. The determinations with regards to power budget, processing speed and available communication technologies are all variable with time. This is because the device can be connected or disconnected from mains power and/or moved to a different area having different available communication technologies and/or undertake different tasks resulting in changes to the processing speed at the device.

A "cost" is attributed to each metric by the metrics module 120. The cost is representative of the current capacity of the node and is variable with time. For example, a "cost" is associated with the power levels of the device. The cost is considered low when the node is connected to mains power and high when the node is not connected to mains power. In addition, the cost may increase as the battery level decreases. In another example, a "cost" is associated with the processing speed of the device. The cost is considered low when the processing speed of the device is high and the cost is considered high when the processing speed of the device is low. In addition, the cost may increase as the processing speed decreases. The cost may or may not have an actual monetary value.

The metrics module 120 is also configured to determine a "cost" for data transfer. The cost of data transfer is dependent on the communication network available to the migration device and the remote device, for example, data transfer using Bluetooth to an adjacent device may be cheaper and faster than data transfer using WiFi, or storing the data to a local Flash. In some instances an actual monetary value can be attracted to data transfers.

The metrics module 120 may determine a cost for power levels or processing speed or data transfer or any combination of power levels or processing speed or data transfer as required by the migration system at any particular time.

The migration determination module 130 is configured to determine when activities are to be migrated and what activities are to be migrated. For example, when an activity is to be undertaken but the device has limited battery power or when an activity is to be undertaken that requires large processing capabilities which would slow down the device etc., the migration determination module 130 determines that the activity could be more efficiently undertaken if migrated to another node. The determination as to when to migrate an activity is based on the current status of the migration device, obtained from the device capabilities monitor 110 and the metrics module 120, such as whether it has sufficient power available, whether it has sufficient processing power and memory available etc. to perform the activity.

The storage module 140 is configured to store information regarding what processing code is stored at the migration device. For example, the storage module 140 may store a code manifest. In one embodiment, the migration system 100 utilises a storage module provided at the node and does not have its own storage module.

The remote devices monitor 150 discovers other nodes within communication range using, for example, UPnP, active or passive wireless scans etc., provided with the migration system to whom it can migrate activities. Examples, of potential migrating nodes are: routers (such as residential WiFi routers or mains powered mesh nodes); phones/tablets currently charging; mains powered computers; other battery powered devices with high remaining battery lifetime etc. The remote devices monitor 150 requests migration information from the discovered nodes. For example, the remote devices monitor 150 requests the capabilities and metrics of each of the discovered nodes, which are provided by each discovered nodes device capabilities monitor and metrics module. The remote devices monitor 150 also requests the code manifest for each node held at each discovered nodes storage module. A determination is then made at the remote devices monitor 150, as to which discovered node, if any, is capable of performing the activity to be migrated at a cost cheaper than the cost of performing the activity at the migration device. When more than one discovered node is capable of performing the activity, the node which is capable of performing the activity at the lowest cost is selected. In one example, the determined cost of migrating an activity can be calculated as the sum of the cost of delivering the data and code (if required) to the remote device, the cost of performing the activity at the remote device and the cost of delivering the results to the migration device.

The request generation module 170 is configured to generate a migration request or requests, and transfers the activity (data and code (if required)) to the selected remote device.

A migrated activities module 160 keeps a log of the activities which been migrated from the device and confirms that the results of a migrated activity have been returned to the device, when the device is functioning as a migration device. In some cases, the results of a migrated activity may be required by a third party device. Rather than the remote device transferring the results of a migrated activity to the migration device, which is then required to transfer the results to the third party device, the remote device can transfer the results to the third party device directly, if the third party device is within communication range of the remote device. In this instance, the remote device also transfers a confirmation to the migration device that the activity has been completed and the results successfully transferred to the third party device.

The migrated activities module 160 also keeps a log of the activities which been migrated to the device for processing, when the device is functioning as a remote device, and confirms that the results of the migrated activity have been transferred to the migration device or a third party device.

After a remote device has received confirmation from the migration device or the third party device that the results of the migrated activity have been received at the migration device or the third party device as appropriate, the results of the migrated activity can be discarded from the memory of the remote device. However, the results of the migrated activity are not to be deleted until after confirmation of receipt has been received. In some embodiments, it may be advantageous to store the results of the migrated activity at the remote device for future reference, even after confirmation of receipt has been received.

When it is determined that a remote device which is currently performing an activity for the migration device is no longer in communication range of the migration device such that a connection to the remote device is lost, the migration device can either perform the activity itself, as the required code and data is kept at the migration device, or can initiate migrating the activity to another node within its communication range. Data loss is prevented.

The request receiving module 180 is configured to receive migration requests from other devices. The request receiving module 180 also transfers information regarding code received from other nodes to the storage module 140 for addition to the code manifest. In some embodiments the device may not accept migration request from other devices, such as a device which is only battery powered. In these embodiments, the migration system 100 does not require a request receiving module 180.

The security module 190 confirms that the nodes within the network comply with the security requirements, discussed in further detail below, required by the migration system provided at the migration device before an activity is transferred to a node.

The migration determination module 130 is also configured to determine the requirements of each activity, i.e. how much processing power each activity requires and the amount of data required/produced by each activity, in order to determine what activities to migrate and when to migrate each activity. The migration determination module 130 analyses code performance and data flows in firmware at the node by randomly creating interception points to monitor the activity at the node. The migration determination module 130 constantly shifts its focus throughout the code base, moving the interception points around to obtain a probabilistic idea of the requirements of each activity with respect to data throughput and computation demand. In another example, the migration determination module 130 analyses code performance and data flows in firmware at the node by cycling sequentially through test points inside the code to monitor the activity at the node. A more accurate prediction of the requirements of each activity can be obtained at nodes which perform repetitive or predictable communication/computation patterns. In addition, when an activity is performed at a node, which consistently produces the same results, regarding the requirements of the activity, then that activity will be monitored less frequently by the migration determination module 130 reducing the amount of monitoring required by these activities. In contrast, more volatile code which does not produce that same results, regarding the requirements of the activity, can be monitored more frequently.

The migration determination module 130 stores a log of the predicted requirements of each activity, which is then used to determine when and what activities to migrate.

The migration determination module 130 is also configured to determine a "cost" associated with each activity for performing the activity at the node. The cost is calculated using the data provided by the metrics module 120 and the requirements of each activity determined by the migration determination module 130.

Some activities may be processing intensive but only require a small amount of data transfer, whilst other activities may have small processing requirements but large data transfer requirements, consequently the amount of data to be migrated for performance of an activity influences the overall "cost" of performing an activity.

The migration system 100 can be downloaded to a node following manufacture or can be provided at the node during manufacture.

FIG. 5 is a flow diagram schematically illustrating a process for migrating an activity to another device. The migration device scans the local area in order to identify other nodes within its communication range provided with the migration system at step S101. The migration device may also perform scans of the local area to discover potential migrating nodes upon activation of the migration device, upon requiring to migrate an activity, upon movement of a migration device to a new area, or periodically. The device then requests the capabilities of the identified nodes at step S102. The capabilities of the identified nodes are determined by the device capabilities monitor provided at each identified node. Each identified node transfers its requested capabilities to the migration device. The migration device then requests the metrics of each of the identified nodes at step S103. The metrics of each of the identified nodes are determined by the metrics module provided at each node. Each identified node transfers its requested metrics to the migration device. The migration device then requests the code manifest of each of the identified nodes at step S104. The code manifest is retrieved from the storage module provided at each identified node. A determination is then made at the migration device, based on the received information, as to which identified node to migrate the activity at step S105. Finally, at step 106, the migration device migrates the code and data required to perform the activity to the identified node (the remote device), or at step 107 the migration device migrates just the data required to perform the activity to the identified node (the remote device) when the code is already provided at the identified node.

In one embodiment, steps S102, S103 and S104 may be performed in any order, for example, step S102 could be performed first followed by steps S104 then S103, step S103 could be performed first followed by steps S102 then S104, or by steps S104 then S102, or S104 could be performed first followed by steps S102 then S103, or by steps S103 then S102. In another embodiment, steps S102, S103 and S104 may be combined into one single step, such that the device requests the device capabilities, the metrics and the code manifest in a single request.

The code can be cached at the remote device so that it can be used again at a later date. The provision of code at the remote device can influence the determination as to which device to migrate the activity as it may be preferable ("cheaper") to migrate an activity to a device which is already provided with the code such that only the data is required to be transferred. In addition, in circumstances where the same remote device is used for the same activity, the storage of the required code at the remote device increases overall efficiency because the code is not required to be transferred each time the activity is to be performed. Following completion of an activity and successful transfer of the results to the migration device, the remote device is permitted to delete the data associated with the activity. At any time during processing of the activity, the remote device or the migration device may move out of range of the other device. When an activity is being undertaken by a remote device that is no longer within communication range, the migration device falls back to processing the activity itself, or looks for another remote device to undertake the activity.

FIG. 6 is a flow diagram schematically illustrating a process for receiving an activity request from another device. At step S201 the device receives a device capabilities request from a migration device and transfers its requested capabilities to the migration device. At step S202 the device receives a metrics request and transfers the requested metrics to the migration device. At step S203 the device receives a code manifest request and transfers the requested code manifest to the migration device. The device may or may not then be selected as the remote device. When the device is not selected to perform the activity, the process ends at step S203. When the device is selected to perform the activity, the device receives at step S204 a request to perform an activity from the migration device together with the code and data required to perform the activity. Alternatively, at step S205 the device receives a request to perform an activity from the migration device together with only the data required to perform the activity, when the code is already provided at the device. The remote device performs the activity at step S206 and the results of the activity are transferred to the migration device/third party device at step S207.

In one embodiment, steps S201, S202 and S203 may be performed in any order, for example, step S201 could be performed first followed by steps S203 then S202, step S202 could be performed first followed by steps S201 then S203, or by steps S203 then S201, or step S203 could be performed first followed by steps S201 then S202, or by steps S202 then S201. In another embodiment, steps S201, S202 and S203 may be combined into one single step, such that the device receives a single request for the device capabilities, the metrics and the code manifest, and transfers the requested information in one response.

The request indicates to whom the results of the activity are to be transferred, i.e. whether the results are to be transferred back to the migration device or to a third party device(s), or both. The request may also identify the code to be used with the data, when the code is already provided at the remote device.

As stated above the migration node can be a cloud server. For example, instead of sending down a dense set of queries/operations covering a large amount of data or a complex control task that requires real time interaction, the cost of sending down a chunk of code with the corresponding data and performing most of the operation on a remote device is cheaper. In this example, the remote device is the device that requires the results of the activity. The cloud measures all metrics and decides autonomously if some of the code is better migrated towards the remote device when the communication latency starts increasing. In addition, remote nodes can keep cached versions of code if required, therefore in many cases just the last data state may be transferred to the remote node.

Each node within the network constantly monitors its own operation as latencies and available bandwidth constantly change such that the migration device makes a determination every time an activity is to be migrated as to where the activity is to be migrated. A remote device which was previously selected to complete an activity may not be the most cost effective remote device to perform the same activity now. In addition, the constant changes in the network results in different amounts of activities being migrated.

When more than one activity is to be migrated, each activity may be migrated to a different or the same identified node as a result of the analysis. Furthermore, if the activities to be migrated are not reliant on the results of any other activities being performed, then the activities can be migrated to more than one remote device, decreasing overall processing time as activities can be performed in parallel on different devices. For example, three independent activities, activities A, B and C, could be migrated to three different remote devices (although the activities could be performed on the same device). The results of each of the activities A, B and C are not required for the other activities to be performed as there are no dependencies. In another example, activities A and B are independent and can be migrated to different devices (although the activities could be performed on the same device). However, activity C requires the results to activities A and B before it can be performed. Therefore, activity C is required to be performed after activities A and B. However, activity C can be performed on the same remote device as activity A or activity B, or can be performed on a completely different device, once the results of activities A and B have been provided.

As stated above, some nodes may be capable of migrating activities but due to their limited resources may not be able to accept migration requests, for example a node which only has battery power. In one example, an IoT watch may be provided with the migration system and a stock prediction application. The watch does not have a mains power supply and has limited processing capabilities, therefore the watch migrates the stock prediction function to a remote device, such as a mobile phone, a router or a cloud server and the stock predictions, once calculated, are transferred to the watch for display to the user, greatly reducing the amount of power and processing capabilities required at the watch to run the stock prediction application. However, in some circumstances a connection to the remote device may be lost prior to the results being transferred to the migration device (watch). Since the watch is provided with the stock prediction application, it comprises the data and code to perform that function itself, or alternatively it could initiate migration of the stock prediction function to another device.

In one embodiment the remote device is not required to complete the activity prior to transferring results to the migration device. For example, the remote device can begin streaming the results of the activity (i.e. the stock predictions) to the migration device as each result (prediction) is calculated. Following transfer of the results to the migration device, the remote device transfers any historical data or information which may be required in future in order to carry out another stock prediction to the migration device. In one embodiment, the remote device does not store data required to perform any activities which have been migrated to it, since further activities may not be completed by the same remote device. In another embodiment, if the remote device has available storage capacity, then the remote device may store data required to perform any activities which have been migrated to it, since the same remote device may be selected to complete further activities. In addition, storing the data required to perform an activity the remote device has already undertaken may make that remote device more desirable to complete the activity again as less data and code may be required to be transferred to it, over a remote device which has not previously completed the activity.

The performance of each activity requires processing code and data to be transferred. In order to migrate an activity both the code and the data need to be transferred to the remote device for performance of the activity, unless the code is already provided at the device. Some activities may require large processing capabilities but small memory capabilities as only a small amount of data is to be processed, whilst other activities require a small amount of processing but a large amount of data. The migration system determines the capabilities of devices within the range of the migrating device and determines which local device is most appropriate.

Once a remote device has performed an activity, it may not be necessary to transfer the code required to perform the same activity a second time to the remote device. For example, the second time that the same activity is to be migrated only the data is required to be migrated to the same remote device as the code required to perform that activity was transferred to the remote device the first time the activity was performed, and the remote device has stored the code.

The network of nodes can be considered to act as one entity as all nodes within the network are capable of acting on the same code, it is possible for the code to migrate from a cloud server to a device and vice versa. By transferring code and data from one node to another node(s) within the network which have the capacity, there is load balancing across the network increasing efficiency of the overall network. From a programmer's perspective, the programmer does not need to be aware of what runs where.

The code is written using object oriented code, for example JAVA, such that the same code can be used at all the nodes across the network (i.e. devices and cloud servers). Below is some exemplary Java Code which can be used at devices and cloud servers.

In one example a light switch is provided with code controlling when to switch the light on. The code is JAVA class files that when run on a cloud server control pins on the device but when run on the device talks to a register on the device.

In another example, code may be provided at a cloud server which takes multiple readings from a plurality of different temperature sensors to determine an average temperature which is communicated to a browser. The code to take the readings and determine the average temperature has been migrated to a border router which calculates the average temperature and transfer the average temperature to the cloud server. If connection to the cloud server is lost it is still possible to perform the activity as the code has been migrated to the router.

A moving average indicator is a JAVA class and has data and code and variables and analogue in and analogue out. The device or gateway can call for the program and transfer data to the device to run it.

Temperature can be read from and stored into a database in the cloud. In addition, using the class approach the temperature can be read into the program without network connectivity.

```
//=========================================================
// DigitalOut
//
public interface DigitalOut {
    void write(boolean value);
    boolean read( );
}
public class LocalDigitalOut implements DigitalOut {
    // talks directly to device hardware
}
public class RemoteDigitalOut implements DigitalOut {
    // talks to device hardware via the network
}
//=========================================================
// DigitalIn
//
public interface DigitalInChangeListener {
    void onDigitalInChanged(DigitalIn sender);
}
public interface DigitalIn {
    boolean read( );
    void addListener(DigitalInChangeListener listener);
}
public class LocalDigitalIn implements DigitalIn {
    // talks directly to device hardware
}
public class RemoteDigitalIn implements DigitalIn {
    // talks device hardware via the network
}
//=========================================================
// Business logic examples
//
// Turns on a light when both switches are on
public class SimpleAndGateExample implements DigitalInChangeListener
{
    // MbedOS.newXXX returns instances appropriate for the runtime
    environment
    private DigitalIn switchOne = MbedOS.newDigitalIn(p18);
    private DigitalIn switchTwo = MbedOS.newDigitalOut(p19);
    private DigitalOut light = MbedOS.newDigitalOut(p20);
    public SimpleAndGateExample( ) {
        switchOne.addListener(this);
        switchTwo.addListener(this);
    }
    public void onDigitalInChanged(DigitalIn... senders) {
        light.write(switchOne.read( ) && switchTwo.read( ));
    }
}
// Temperature logger using local storage
public class TemperatureLogger {
    private AnalogIn temperature = MbedOS.newAnalogIn(p19);
    private Storage localStorage = new Storage( ); // local storage in
    client is sync'd by runtime
when connectivity is restored
    public class TemperatureLogger( ) {
        temperature.addListener(this);
    }
        public void onAnalogInChanged(AnalogIn sender) {
            localStorage.put(System.currrentTimeMillis( ), sender.read( ));
        }
}
//
public class MovingAverageUtil {
    // ...some member variables
    public float getAverage(float value) {
        return blah;
    }
}
// Sets an AnalogOut pin based on the moving average of an ADC
conversion
public class MovingAverageIndicator implements
AnalogInChangeListener {
    private MovingAverageUtil averageUtil = new
    MovingAverageUtil( );
    private AnalogIn in = MbedOS.newAnalogIn(p19);
    private AnalogOut out = MBedOS.newAnalogOut(p20);
    public MovingAverageIndicator( ) {
        in.addListener(this);
    }
    public void onAnalogInChanged(AnalogIn sender) {
        float newAverage = averageUtil.getAverage(sender.read( ));
        out.write(newAverage);
    }
}
```

By keeping detailed statistics on all nodes within the network it is possible to optimize the processing capabilities of each node within the network. As a result of the dynamic nature of the network it is possible for a remote node which is performing an activity for a migration node to lose connection to the network at any time, therefore only after confirming reception of the completed activity at the migration device can the remote device discard the command.

It is also possible for a migration node to migrate an activity to a remote node, the results of the activity being required by a different node (not the migration node), the remote node can transfer the result to the different node rather than transferring the result back to the migration node for transfer to the different node, therefore the remote node can be considered an intermediate node. If parts of an operation are already done at an intermediate node, but the connection is lost, then the calculation can be performed again either by the migration node itself or at a newly selected remote node—resulting in finalizing that operation.

In one embodiment, the migration determination module which is the decision-making part of the migration system can be migrated to another device since it is just another process it can then notify nodes to migrate individual operations.

The migration system is provided at both the migration node and the remote node. However, the user of the migration node is not able to access the data and code which is transferred to the remote device for processing, and the user of the remote node is not able to access the data and code which has been transferred from the migration node for processing. The data and code which is migrated is encrypted so that it cannot be accessed at the nodes within the network, creating a secure execution environment. In one example, the users of either or both of the migration node and the remote node may not be aware that an activity has been migrated from their node for processing at another node, or that an activity has been migrated to their device for processing. In addition, the device does not act differently when it is processing a migrated activity from when it is not processing a migrated activity.

In one example any device which is to be provided with the migration system must comply with the security requirements of the migration system so that a secure execution environment is provided. Therefore, to be part of a network, a node must be provided with the migration system which complies with the security requirements of the migration system within the network in order to perform activities for any other node within the network, the nodes are not required to be owned by the same user but must have the correct security assurances.

The migration system described may be implemented at least in part in software. Those skilled in the art will appreciate that the migration system described above may be implemented using general purpose computer equipment or using bespoke equipment.

Those skilled in the art will appreciate that while the foregoing has described what is considered to be the best mode and where appropriate other modes of performing the embodiments, the embodiments should not be limited to the specific configurations and methods disclosed in this description. Those skilled in the art will recognise that the teachings have a broad range of applications, and that the embodiments may take a wide range of modifications without departing from the inventive concept as defined in the appended claims.

In embodiments the migration determination module may create interception points to monitor the activity at the node, moving the interception points around to obtain a probabilistic idea of the processing requirements of the activity with respect to data throughput and computation demand.

In another embodiment the migration determination module may create test points to monitor the activity at the node, and cycles sequentially through the test points to obtain a probabilistic idea of the processing requirements of the activity with respect to data throughput and computation demand.

In another embodiment the device capabilities monitor may determine one or more of processing capabilities, storage capabilities and power capabilities of the node provided with the system.

In another embodiment node metrics may include one or more of power supply at the node, processing speed of the node, and communication networks available to the node.

In another embodiment the other nodes in the network may be within communication range of the node and are provided with the system.

In another embodiment the remote devices monitor may be further configured to request the capabilities and metrics of the identified other nodes, and wherein the remote devices monitor selects one of the identified other nodes to perform the activity as a result of the capabilities and metrics of the identified other nodes.

In another embodiment the remote devices monitor may determine a cost of migrating an activity to the identified other nodes and selects the one of the identified other nodes to perform the activity having the lowest determined cost.

In another embodiment the cost may be calculated as the sum of the cost of delivering the activity to the selected node, the cost of performing the activity at the selected node and the cost of delivering the results to the node.

In another embodiment the remote devices monitor may be further configured to request a code manifest from the identified other nodes in the network and wherein the remote devices monitor may select one of the identified other nodes to perform the activity as a result of the capabilities, the metrics and the code manifest of the identified other nodes.

In another embodiment the system may further comprise: a migrated activities module configured to determine that a result for the migrated activity has been returned to the node.

In another embodiment the returned result for the migrated activity indicates that the result has been transferred to another node.

In another embodiment the migrated activities module may be further configured to determine that a result for the migrated activity has not been returned to the node.

In another embodiment the migrated activities module may be further configured to determine that the selected node is no longer within communication range of the node and to select another one of the identified other nodes to perform the activity.

In another embodiment the system may further comprise: a request receiving module configured to receive requests to perform activities from other nodes in the network.

In another embodiment the migrated activities module may be further configured to determine that the received activity has been completed and that the results of the received activity have been transferred to the node which requested performance of the activity.

In another embodiment the system may further comprise: a security module configured to determine that the nodes within a network of nodes comply with the security requirements of the system.

In another embodiment the system may further comprise: a storage module configured to store a code manifest detailing code stored at the node.

In another embodiment the migration determination module may store the processing requirements of the activity.

In another embodiment the computer application program may further comprise: determining the processing requirements of the activity by randomly creating interception points to monitor the activity, and moving the interception points around to obtain a probabilistic idea of the processing requirements of the activity with respect to data throughput and computation demand.

In another embodiment the computer application program may further comprise: determining the processing requirements of the activity by creating test points to monitor the activity, and cycling sequentially through the test points to obtain a probabilistic idea of the processing requirements of the activity with respect to data throughput and computation demand.

In another embodiment the computer application program may further comprise: obtaining a code manifest from each node within the network of nodes and determining whether the code required by the activity is already provided at any of the nodes within the network of nodes; determining that performance of the activity is to be completed by one of the nodes within a network of nodes selected as a result of the determined processing requirements of the activity, the determined capabilities of each node, the determined metrics of performing the activity at each node and the obtained code manifest.

In another embodiment the computer application program may further comprise: determining that the selected node is no longer within communication range of the computer application program; and determining that performance of the activity is to be completed by one of the other nodes within the network of nodes.

In another embodiment the computer application program may further comprise: determining that a result for the migrated activity has been returned to the node.

In another embodiment the computer application program may further comprise: determining that the nodes within the network of nodes comply with the security requirements of the computer application program.

The systems and methods of the embodiments enable activities to be migrated between nodes in a network resulting in load balancing across the network.

Additional advantages and novel features will be set forth in part in the description which follows, and in part will become apparent to those skilled in the art upon examination of the following and the accompanying drawings or may be learned by production or operation of the examples. The advantages of the present teachings may be realised and attained by practice or use of various aspects of the methodologies, instrumentalities and combinations set forth in the detailed examples discussed below.

The invention claimed is:

1. A system for selecting a node within a network of nodes for performing an activity, the system comprising:
a device capabilities monitor configured to determine capabilities of a migration node provided within the network, the migration node configured to perform activities;
a metrics generator configured to determine node metrics of the migration node;
a migration determiner configured to determine processing requirements of the activities, and to determine which of the activities to migrate from the migration node to a remote node in the network as a result of the determined processing requirements of the activities, the determined capabilities of the migration node and the determined node metrics of the migration node;
a remote devices monitor configured to identify remote nodes within the network of nodes, (1) to request a respective code manifest from each of the identified remote nodes, the respective code manifests being stored in a respective storage of said each of the identified remote nodes and having stored information relating to processing code stored at said each of the identified remote nodes (2) to determine, based at least on whether the respective received code manifests indicate presence of processing code for the activity to be migrated on each of the identified remote nodes, a respective cost for migrating the processing code to each of the identified remote nodes, and (3) to select, based at least on the determined respective costs, one of the identified remote nodes to perform the activity to be migrated; and
a request generator configured to transfer the activity to be migrated to the selected remote node by transferring, based on whether the respective code manifest received from the selected identified remote node indicates presence of the processing code for the activity at the selected identified remote node, (A) the processing code and data or (B) the data,
wherein the migration determiner is further configured to create at least one of interception points or test points in the processing code to monitor the activities at the migration node, and wherein the migration determiner moves the interception points around or cycles sequentially through the test points, to obtain a probabilistic idea of the processing requirements of the activities with respect to data throughput and computation demand.

2. The system of claim 1, wherein the device capabilities monitor determines one or more of processing capabilities, storage capabilities and power capabilities of the migration node.

3. The system of claim 1, wherein the node metrics include one or more of power supply at the node, processing speed of the node, and communication networks available to the migration node.

4. The system of claim 1, wherein the remote nodes in the network are within communication range of the migration node and are provided within the system.

5. The system of claim 4, wherein the remote devices monitor is further configured to request the capabilities and metrics of the identified remote nodes, and wherein the remote devices monitor selects one of the identified remote nodes to perform the activity to be migrated as a result of the capabilities and metrics of the identified remote nodes and code manifests of the identified remote nodes.

6. The system of claim 4, wherein the remote devices monitor is further configured to determine a cost of migrating the activity to be migrated to the identified remote nodes and selects the one of the identified remote nodes to perform the activity to be migrated having the lowest determined cost.

7. The system of claim 6, wherein the cost is calculated as the sum of the cost of delivering the activity to be migrated to the selected remote node, the cost of performing the activity to be migrated at the selected node and the cost of delivering the results of performing the activity to be migrated at the selected remote node to the migration node.

8. The system of claim 1, further comprising:
a migrated activities tracker configured to determine that a result for the activity to be migrated at the selected remote node has been returned to the migration node.

9. The system of claim 8, wherein the returned result for the migrated activity indicates that the result has been transferred to another node.

10. The system of claim 8, wherein the migrated activities tracker is further configured to determine that a result for performing the activity to be migrated at the selected remote node has not been returned to the node.

11. The system of claim 10, wherein the migrated activities tracker is further configured to determine that the selected node is no longer within communication range of the migration node, and to select another one of the identified remote nodes to perform the activity to be migrated.

12. The system of claim 1, further comprising:
a request receiver configured to receive requests to perform activities from remote nodes in the network.

13. The system of claim 12, wherein the migrated activities tracker is further configured to determine that the received activity has been completed and that the results of performing the received activity have been transferred to the remote node which requested performance of the activity.

14. The system of claim 1, further comprising:
a security determiner configured to determine that the nodes within the network of nodes comply with the security requirements of the system.

15. The system of claim 1, further comprising:
a storage configured to store a code manifest detailing processing code stored at the node.

16. The system of claim 1, wherein the migration determiner stores the processing requirements of the activities.

17. A non-transitory computer readable storage medium storing a computer application program for carrying out a method of selecting a node within a network of nodes for performing an activity, wherein each node is configured to perform activities, and wherein the program, when executed by a computer, performs operations comprising:
determining capabilities of each of a plurality of nodes within the network of nodes;
determining nodes metrics of each of the plurality of nodes within the network of nodes;
determining processing requirements of the activities;
determining metrics of performing the activities at each of the plurality of nodes within the network of nodes;
obtaining a respective code manifest from each node within the network of nodes, the respective code manifests being stored in a respective storage of said each of the nodes and having stored information relating to processing code stored at said each of the nodes and determining, based on at least whether the received code manifests indicate an extent to which processing code required by the activities is already provided at any of the nodes within the network of nodes, a respective cost for migrating the processing code to each of the nodes;

determining which of the activities is to be migrated to one of the nodes within the network of nodes, the node is selected as a result of the determined processing requirements of the activities, the determined capabilities of each node, the determined respective cost and the determined metrics of performing the activity at each node;

requesting performance of the activities to be migrated to the selected node, the request identifying the activity to be migrated by transferring, based on whether the respective code manifest received from the selected node indicates presence of the processing code for the identified activity at the selected node, (A) the processing code and data or (B) the data; and determining the processing requirements of the activities by creating at least one of: interception points or test points in the processing code to monitor the activities, wherein the interception points are created randomly and moved around or the test points are cycled through sequentially, to obtain a probabilistic idea of the processing requirements of the activities with respect to data throughput and computation demand.

18. The non-transitory computer readable storage medium of claim 17, wherein the stored computer application program, when executed by the computer, performs further operations:

determining that the selected node is no longer within communication range of the computer application program; and determining that performance of the activity to be migrated is to be completed by one of the other nodes within the network of nodes.

19. The non-transitory computer readable storage medium of claim 17, wherein the stored computer application program, when executed by the computer, performs further operations:

determining that a result for the migrated activity has been returned to the node.

20. The non-transitory computer readable storage medium of claim 17, wherein the stored computer application program, when executed by the computer, performs further operations:

determining that the nodes within the network of nodes comply with the security requirements of the computer application program.

21. A method of migrating an activity from a migration node to a remote node in a network of nodes, each node configured to perform activities, the method comprising:

identifying remote nodes within communication range of the migration node;

requesting capabilities of each of the identified remote nodes;

requesting node metrics of each of the identified remote nodes;

requesting a respective code manifest of each of the identified remote nodes, the respective code manifests being stored in a respective storage of said each of the identified remote nodes and having stored information relating to processing code stored at said each of the identified remote nodes;

determining, based at least on whether the respective received code manifests indicate presence of processing code for an activity to be migrated on each of the identified remote nodes, a respective cost for migrating the processing code to each of the identified remote nodes;

selecting, based at least on the determined respective costs, one of the identified remote nodes to perform the activity to be migrated;

determining the processing requirements of the activities by creating at least one of: interception points or test points in the processing code to monitor the activities, wherein the interception points are created randomly and moved around or the test points are cycled through sequentially, to obtain a probabilistic idea of the processing requirements of the activities with respect to data throughput and computation demand;

determining the activity to be migrated from the migration node to a remote node within the network and using the requested capabilities, metrics, determined processing requirements of the activities and code manifests to select one of the identified remote nodes to migrate the activity to; and transferring, based on whether the code manifest received from the selected identified remote node indicates presence of the processing code for the determined activity at the selected identified remote node, (A) the processing code and data or (B) the data to the selected remote node.

22. A non-transitory computer readable medium recorded with computer readable code arranged to cause a computer to perform the method of claim 21.

* * * * *